US00RE44244E

(19) United States
(12) Reissued Patent
Varma et al.

(10) Patent Number: US RE44,244 E
(45) Date of Reissued Patent: May 28, 2013

(54) DYNAMIC WIRELESS LINK ADAPTATION

(75) Inventors: Subir Varma, San Jose, CA (US); Reza Majidi-Ahy, Los Altos, CA (US); Joseph Hakim, Boulder Creek, CO (US); Wendy Chiu Fai Wong, San Jose, CA (US)

(73) Assignee: Wi-Lan, Inc., Ottawa (CA)

(21) Appl. No.: 12/816,928

(22) Filed: Jun. 16, 2010
(Under 37 CFR 1.47)

Related U.S. Patent Documents

Reissue of:
(64) Patent No.: 7,388,919
Issued: Jun. 17, 2008
Appl. No.: 11/231,537
Filed: Sep. 20, 2005

U.S. Applications:
(63) Continuation of application No. 10/700,352, filed on Nov. 3, 2003, now Pat. No. 6,947,479, which is a continuation of application No. 09/665,394, filed on Sep. 20, 2000, now Pat. No. 6,643,322.

(51) Int. Cl.
*H04L 27/00* (2006.01)
*H04L 1/00* (2006.01)
*H04B 17/00* (2006.01)

(52) U.S. Cl.
USPC ..... 375/259; 375/227; 714/749; 455/67.13

(58) Field of Classification Search
USPC ..... 375/224, 225, 227, 259, 261, 262, 375/265, 340, 341; 340/3.1; 455/67.11, 67.13; 714/708, 712, 721, 748, 749
See application file for complete search history.

(56) References Cited

U.S. PATENT DOCUMENTS 5,546,411 A 8/1996 Leitch et al.
5,625,875 A 4/1997 Whinnett et al.

(Continued)

FOREIGN PATENT DOCUMENTS

DE 197 28 469 A1 1/1999
DE 19728469 1/1999

(Continued)

OTHER PUBLICATIONS

Bakhtiyari et al. "Practical Implementation of a Mobile Data Link Protocol with a Type II Hybrid ARQ Scheme and Code Combining." IEEE, May 18, 1993, pp. 774-777.

(Continued)

*Primary Examiner* — Young T. Tse
(74) *Attorney, Agent, or Firm* — Procopio, Cory, Hargreaves & Savitch LLP

(57) ABSTRACT

A system that adapts wireless link parameters for a wireless communication link. A measure is determined of errors occurring in communication over a wireless link. In a case that the measure of errors corresponds to more errors than a first predetermined threshold, communication changes from a first set of wireless link parameters to a second set of wireless link parameters. The second set of wireless link parameters corresponds to higher error tolerance than the first set of wireless link parameters. In a case that the measure of errors corresponds to fewer errors than a second predetermined threshold, communication changes from the first set of wireless link parameters to a third set of wireless link parameters. The third set of wireless link parameters corresponds to lower error tolerance than the first set of wireless link parameters. Preferably, the measure of errors is determined by monitoring a number of NACK messages and a number of ACK messages that occur. It is determined that the measure of errors corresponds to more errors than the first predetermined threshold when more than a predetermined number of NACK messages occur in succession. It is determined that the measure of errors corresponds to fewer errors than the second predetermined threshold when more than a predetermined number of ACK messages occur in succession.

12 Claims, 4 Drawing Sheets

U.S. PATENT DOCUMENTS

| | | | | |
|---|---|---|---|---|
| 5,657,325 | A | 8/1997 | Lou et al. | |
| 5,764,699 | A | 6/1998 | Needham et al. | |
| 6,154,489 | A | 11/2000 | Kleider et al. | |
| 6,275,712 | B1 * | 8/2001 | Gray et al. | 455/522 |
| 6,310,909 | B1 | 10/2001 | Jones | |
| 6,519,731 | B1 | 2/2003 | Huang et al. | |
| 6,643,322 | B1 | 11/2003 | Varma et al. | |
| 6,947,479 | B2 | 9/2005 | Varma et al. | |
| 7,388,919 | B2 | 6/2008 | Varma et al. | |
| 2006/0098582 | A1 | 5/2006 | Varma | |

FOREIGN PATENT DOCUMENTS

| | | | |
|---|---|---|---|
| EP | 0 869 647 | A2 | 7/1998 |
| EP | 0869647 | | 7/1998 |
| WO | WO 97/17768 | A1 | 5/1997 |
| WO | WO 9717768 | | 5/1997 |
| WO | WO 98/59523 | A2 | 12/1998 |
| WO | WO 9859523 | | 12/1998 |
| WO | WO 99/01959 | A2 | 1/1999 |
| WO | WO 9901959 | | 1/1999 |
| WO | WO 99/12303 | A1 | 3/1999 |
| WO | WO 99/14975 | A2 | 3/1999 |
| WO | WO 9912303 | | 3/1999 |
| WO | WO 9914975 | | 3/1999 |
| WO | WO 99/23844 | A2 | 5/1999 |
| WO | WO 9923844 | | 5/1999 |
| WO | WO 99/44341 | A1 | 9/1999 |
| WO | WO 9944341 | | 9/1999 |
| WO | WO 01/50633 | A1 | 7/2001 |
| WO | WO 01/50669 | A1 | 7/2001 |
| WO | WO 0150633 | | 7/2001 |
| WO | WO 0150669 | | 7/2001 |
| WO | WO 02/25856 | A2 | 3/2002 |
| WO | WO 0225856 | | 3/2002 |

OTHER PUBLICATIONS

Annamalai et al. "Analysis and Optimization of Adaptive Multicopy Transmission ARQ Protocols for Time-Varying Channels." IEEE Transactions on Communications, Oct. 1998, pp. 1356-1368, vol. 46, No. 10.

Civanlar et al. "Self-Healing in Wideband Packet Networks." IEEE Network, Jan. 1990, pp. 35-39, vol. 4, No. 1.

Kallel et al. "An Adaptive Hybrid ARQ Scheme." Wireless Personal Communications 12, 2000, pp. 297-311, Kluwer Academic Publishers, Netherlands.

* cited by examiner

DYNAMIC WIRELESS LINK ADAPTATION

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation of U.S. application Ser. No. 10/700.352, filed Nov. 3, 2003, now U.S. Pat. No. 6,947,479, which is a continuation of U.S. application Ser. No. 09/665,394, filed Sep. 20, 2000, now U.S. Pat. No. 6,643,322. This application hereby incorporates by reference and claims benefit of these parent applications.

BACKGROUND OF THE INVENTION

1. Field of the Invention

This invention relates to dynamic adaptation of link parameters for wireless communication; in particular, the invention relates to dynamic adaptation of link parameters such as modulation scheme, symbol rate, and error correction scheme for a wireless communication link.

2. Description of the Related Art

Conventional wireless communication systems adapt their modulation schemes based on periodic measurements of channel quality. A measurement of channel quality used by these systems is a bit error rate (BER) statistic. These conventional systems have several drawbacks.

First, different modulation schemes can have radically different throughput efficiencies and error tolerances. As a result, a change in modulation schemes to accommodate an increase in communication errors can result in an unacceptable decrease in throughput efficiency.

Second, BER statistics take some time to change in order to reflect an increase in communication errors. The periodic nature of BER statistic computations exacerbates this problem. In particular, a change in a rate of communication errors is not reflected in the BER statistics until an end of a period. If the error rate changes near the end of the period, the BER statistics may not reflect the change until the end of the next period. During this delay, a modulation scheme with unacceptable error tolerance may be utilized, adversely impacting communication over a wireless link.

SUMMARY OF THE INVENTION

Accordingly, what is needed is a system of dynamically adapting a set of wireless link parameters that provides a better selection of throughput versus error tolerance options and that adapts more efficiently to changes in communication error rates.

One embodiment of the present invention that addresses the foregoing need is a method of dynamically adapting wireless link parameters. A measure is determined of errors occurring in communication over a wireless link. In a case that the measure of errors corresponds to more errors than a first predetermined threshold, communication changes from a first set of wireless link parameters to a second set of wireless link parameters. The second set of wireless link parameters corresponds to higher error tolerance than the first set of wireless link parameters. In a case that the measure of errors corresponds to fewer errors than a second predetermined threshold, communication changes from the first set of wireless link parameters to a third set of wireless link parameters. The third set of wireless link parameters corresponds to lower error tolerance than the first set of wireless link parameters.

By utilizing at least three sets of wireless link parameters, the invention provides greater flexibility for adapting to changes in communication error rates.

Preferably, the measure of errors is determined by monitoring a number of NACK messages and a number of ACK messages that occur. It is determined that the measure of errors corresponds to more errors than the first predetermined threshold when more than a predetermined number of NACK messages occur in succession. It is determined that the measure of errors corresponds to fewer errors than the second predetermined threshold when more than a predetermined number of ACK messages occur in succession.

The foregoing monitoring for successive NACK and ACK messages can occur continuously. As a result, adaptation of wireless link parameters can occur as soon as a successive number of NACK or ACK messages is received, allowing for more rapid and efficient adaptation to communication conditions.

Each set of wireless link parameters can include a modulation scheme, a symbol rate, and/or an error correction scheme. In a preferred embodiment, each set of wireless link parameters includes Quadrature Amplitude Modulation or Quadrature Phase Shift Keying, high symbol rate or low symbol rate, and high forward error correction or low forward error correction.

The foregoing sets of parameters have been found to provide good flexibility for adapting communication over a wireless link to accommodate various error rates. Other parameters may be utilized, possibly but not necessarily including the foregoing parameters.

Each set of wireless link parameters corresponds to a relationship between throughput efficiency and error tolerance. The first predetermined threshold preferably corresponds to where the relationship for the first set of wireless link parameters intersects the relationship for the second set of wireless link parameters. The second predetermined threshold preferably corresponds to where the relationship for the first set of wireless link parameters intersects the relationship for the third set of wireless link parameters.

An optimal set of parameters tends to be automatically selected for a given error rate by using theses intersections as thresholds for changing between sets of parameters.

The invention also can be embodied in communication systems, communication hardware, MMDS head ends, and software for controlling MMDS communication that utilizes the foregoing methods. Other embodiments of the invention are possible.

By virtue of the foregoing arrangements, the invention provides a better selection of throughput versus error tolerance options and adapts more efficiently to changes in communication error rates.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Figure 1:
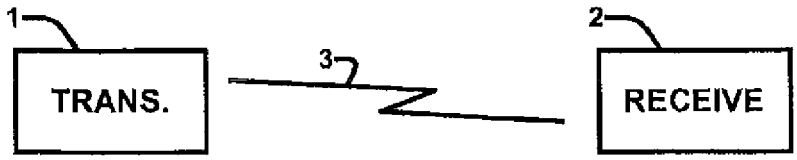
FIG. 1 is a block diagram of a wireless communication link.

FIG. 1 is a block diagram of a wireless communication link. Shown in FIG. 1 are transmitter 1 in communication with receiver 2 over wireless link 3. Examples of the arrangement shown in FIG. 1 include, but are not limited to, cellular phone communication, wireless cable services, multipoint multichannel distribution services (MMDS), and any other wireless communication. The invention is equally applicable to one-way communication, two-way communication, and any other types of wireless communication. A single device can be a transmitter, a receiver, or both for wireless communication according to the invention.

Figure 2:
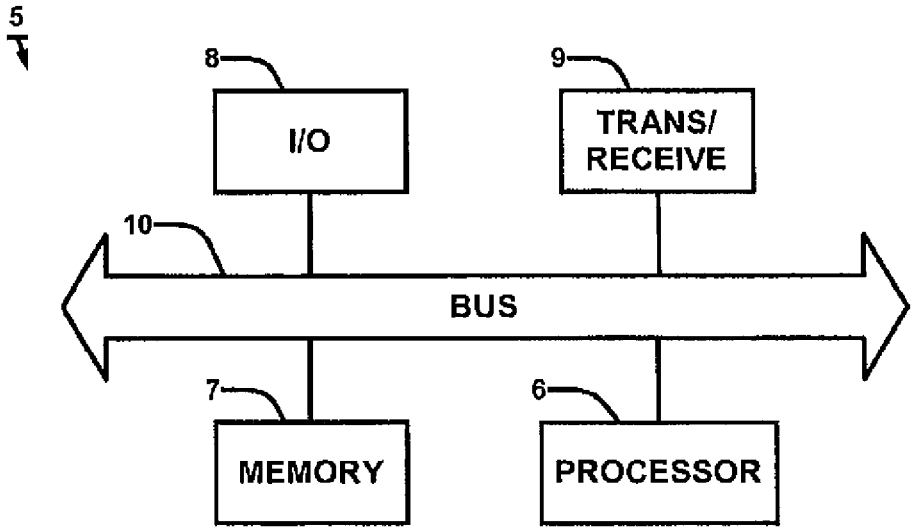
FIG. 2 is a block diagram of a device that can participate in wireless communication according to one embodiment of the invention.

FIG. 2 is a block diagram of a device that can participate in wireless communication according to one embodiment of the invention. Device 5 can serve as transmitter 1 and/or receiver 2.

Device 5 includes processor 6, memory 7, input/output (I/O) 8 and transmitter/receiver 9, which communicate with each other over bus 10. Processor 6 controls the operation of device 5 based on instructions stored in memory 7. According to the invention, processor 6 can modify wireless communication link parameters ("wireless link parameters") for communication over a wireless link such as wireless link 3.

Memory 7 can be a fixed memory such as DRAMs, SRAMs, hard disks, caches, etc., or removable memory such as floppy disks, CD-ROMs, data tapes, etc, or any combination of these memories. Memory 7 preferably stores instructions executable by processor 6 and data for use during execution of those instructions. Data stored in memory 7 preferably includes wireless link parameters for communication over a wireless link. Processor 6 executes the instructions stored in memory 7 so as to implement dynamic adaptation of these wireless link parameters, as explained in more detail below with respect to FIGS. 3 to 6.

I/O 8 is provided for sending and/or receiving data from an external source. This data preferably includes data to be sent and/or data received over a wireless communication link. Alternatively, I/O can be omitted, and data can be sent and/or received from another source connected to bus 10 such as memory 7 or transmitter/receiver 9.

Transmitter/receiver 9 provides an interface to a wireless communication link such as wireless link 3. Transmitter/receiver 9 in FIG. 2 allows two-way communication over such a wireless link. In alternative embodiments of the invention, the wireless link interface can be only a transmitter or only a receiver, depending on the particular use for device 5.

Figure 3:
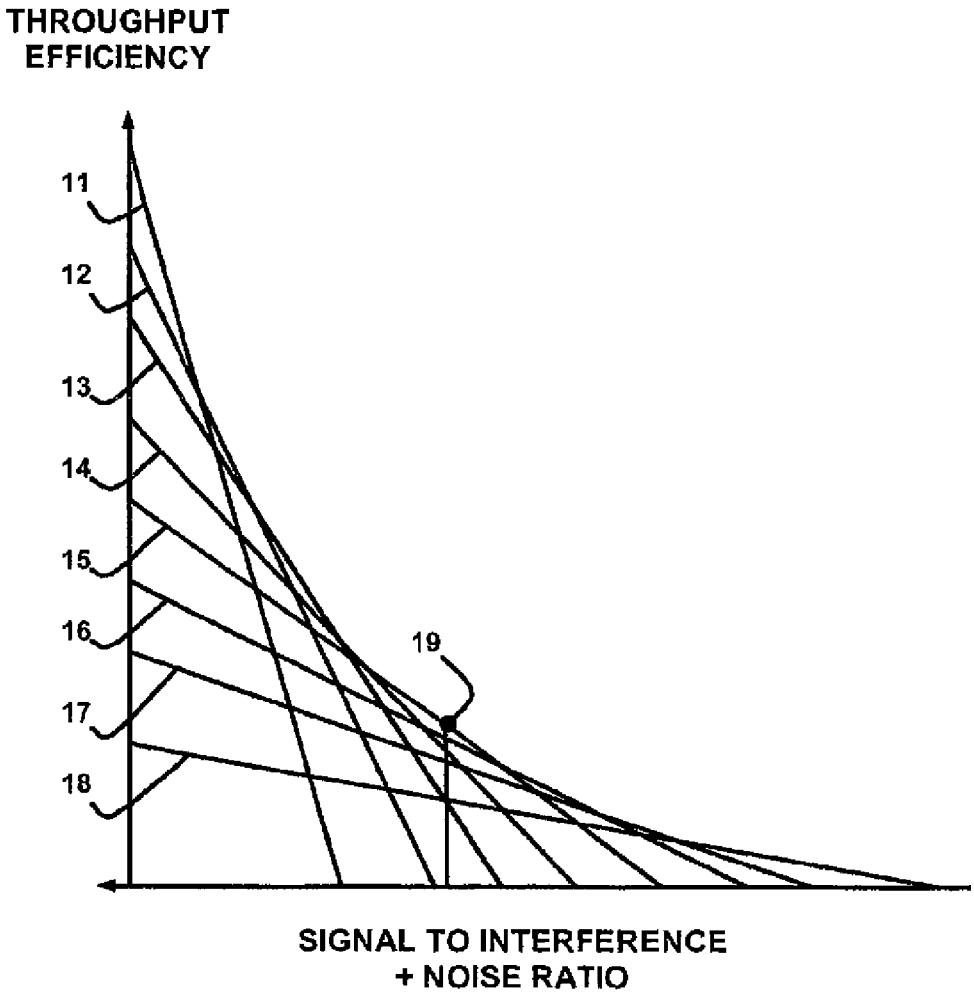
FIG. 3 is a graph illustrating throughput efficiency versus signal to interference plus noise ratio for various wireless link parameters.

FIG. 3 is a graph illustrating throughput efficiency versus signal to interference plus noise ratio for various wireless link parameters. The graph in FIG. 3 is provided for illustrative purposes only. The invention is not limited in any way to the particulars of the graph.

The vertical axis of the graph in FIG. 3 represents throughput efficiency, with efficiency increasing from toward the top of the graph. The horizontal axis of the graph represents a signal to interference plus noise ratio (SINR), with the SINR increasing from right to left of the graph. Thus, error rate increases from left to right in FIG. 3.

For the sake of conciseness, the term "error rate" herein represents errors caused by noise, interference and any other factors (e.g., distance) that can degrade signal quality and result in lower SINR. Likewise, the term "error tolerance" herein represents tolerance to noise, interference and any other factors that can degrade signal quality and result in lower SINR.

Lines 11 through 18 in FIG. 3 represent relationships between throughput efficiency and SINR for various combinations of wireless link parameters. For each line, the throughput efficiency decreases monotonically as the SINR decreases (i.e, as error rate increases), because more retransmissions are needed to recover from errors. Thus, line [111] *11* has a higher throughput efficiency for lower error rates than line 12, but line 12 has a higher throughput efficiency for higher error rates.

As between the sets of wireless link parameters represented by lines 11 and 12, line 11 has lower error tolerance and represents a preferred set of wireless link parameters for lower error rates (i.e., higher SINR). Line 12 has higher error tolerance and represents a preferred set of wireless link parameters for higher error rates (i.e., lower SINR). According to the invention, wireless link parameters preferably should be switched from those represented by line 11 to those represented by line 12 at the point at which lines 11 and 12 intersect.

Lines 12 to 18 are interrelated in a similar manner as lines 11 and 12, as shown by the graph in FIG. 3. Thus, a preferred set of wireless link parameters for any given SINR corresponds to the line with the highest throughput efficiency for that given SINR. For example, the preferred set of wireless link parameters for a SINR at point 19 in FIG. 3 is the set of wireless link parameters that corresponds to line 15.

The graph in FIG. 3 includes eight lines 11 to 18. Thus, the graph represents the interrelationship between eight sets of wireless link parameters. In one embodiment of the invention, each set of wireless link parameters includes a modulation scheme, a symbol rate, and an error correction scheme. For example, the modulation scheme can be Quadrature Amplitude Modulation (QAM) or Quadrature Phase Shift Keying (QPSK), the symbol rate can be high symbol rate (HSR) or low symbol rate (LSR), and the error correction scheme can be high forward error correction (high FEC) or low forward error correction (low FEC). The following table illustrates one possible set of correspondences between lines 11 to 18 and these wireless link parameters:

| Line | Wireless Link Parameters |
|---|---|
| 11 | QAM, HSR, Low FEC |
| 12 | QAM, HSR, High FEC |
| 13 | QAM, LSR, Low FEC |
| 14 | QAM, LSR, High EEC |
| 15 | QPSK, HSR, Low FEC |
| 16 | QPSK, HSR, High FEC |

-continued

| Line | Wireless Link Parameters |
|---|---|
| 17 | QPSK, LSR, Low FEC |
| 18 | QPSK, LSR, High FEC |

Of course, the invention is equally applicable to different sets and different orderings of wireless link parameters. These different sets can include some, none, or all of the wireless link parameters discussed above, as well as other wireless link parameters. For example, the parameters can include different modulation schemes and variations on those modulation schemes (e.g., 16 QAM vs. 64 QAM), different symbol rates and encodings, different error correction schemes, and the like. Furthermore, the invention is not limited to eight sets of wireless link parameters. Any number of different sets of wireless link parameters may be utilized.

Figure 4:
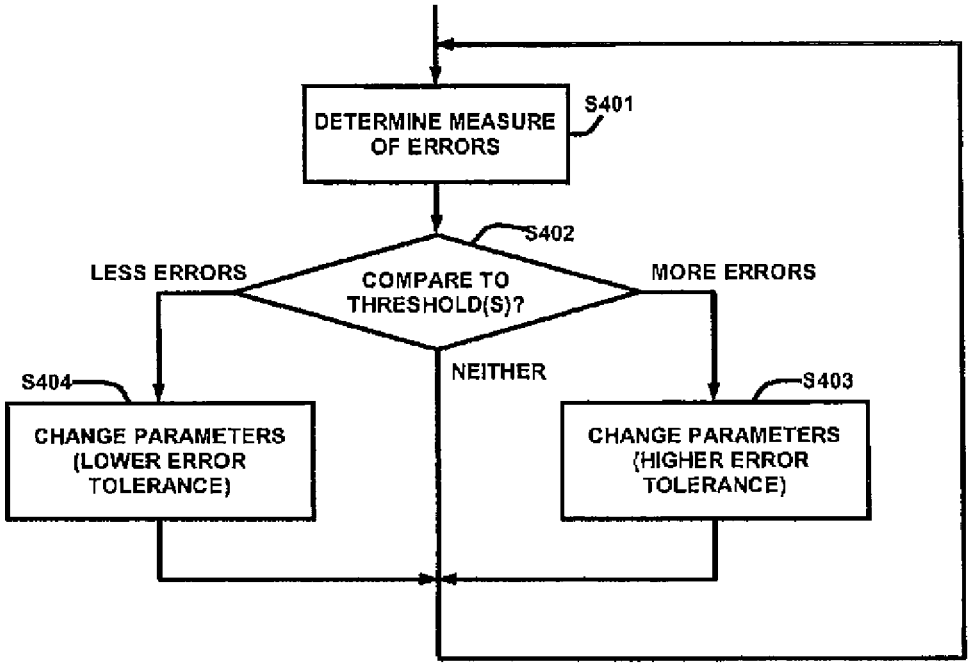
FIG. 4 is a flowchart illustrating dynamic adaptation of wireless link parameters according to a preferred embodiment of the invention.

FIG. 4 is a flowchart illustrating dynamic adaptation of wireless link parameters according to a preferred embodiment of the invention.

Briefly, wireless link parameters are dynamically adapted. A measure is determined of errors occurring in communication over a wireless link. In a case that the measure of errors corresponds to more errors than a first predetermined threshold, communication changes from a first set of wireless link parameters to a second set of wireless link parameters. The second set of wireless link parameters corresponds to higher error tolerance than the first set of wireless link parameters. In a case that the measure of errors corresponds to fewer errors than a second predetermined threshold, communication changes from the first set of wireless link parameters to a third set of wireless link parameters. The third set of wireless link parameters corresponds to lower error tolerance than the first set of wireless link parameters.

In more detail, a measure or measures are determined in step S401 of errors occurring in communication over a wireless link. This measure can be generated by a receiving device, a sending device, or both. In step S402, this measure is compared to thresholds. If the measure indicates that more errors than a first threshold have occurred, then flow proceeds to step S403. If the measure indicates that less errors than a second threshold have occurred, then flow proceeds to step S404. Otherwise, flow returns to step S401. A preferred method for implementing steps S401 and S402 is described below with respect to FIG. 5.

The first threshold in step S402 preferably is a predetermined threshold corresponding to where the relationship for a first set of wireless link parameters intersects the relationship for a second set of wireless link parameters Likewise, the second threshold in step S402 preferably is a predetermined threshold corresponding to where the relationship for the first set of wireless link parameters intersects the relationship for a third set of wireless link parameters.

In step S403, wireless link parameters are changed from the first set of wireless link parameters to the second set of wireless link parameters. According to the invention, the second set of wireless link parameters corresponds to higher error tolerance than the first set of wireless link parameters.

In step S404, wireless link parameters are changed from the first set of wireless link parameters to the third set of wireless link parameters. According to the invention, the third set of wireless link parameters corresponds to lower error tolerance than the first set of wireless link parameters.

After steps S403 and S404, flow returns to step S401.

By virtue of the foregoing operation, wireless link parameters are dynamically adapted to a preferred set of wireless link parameters for a given measure of errors.

Figure 5:
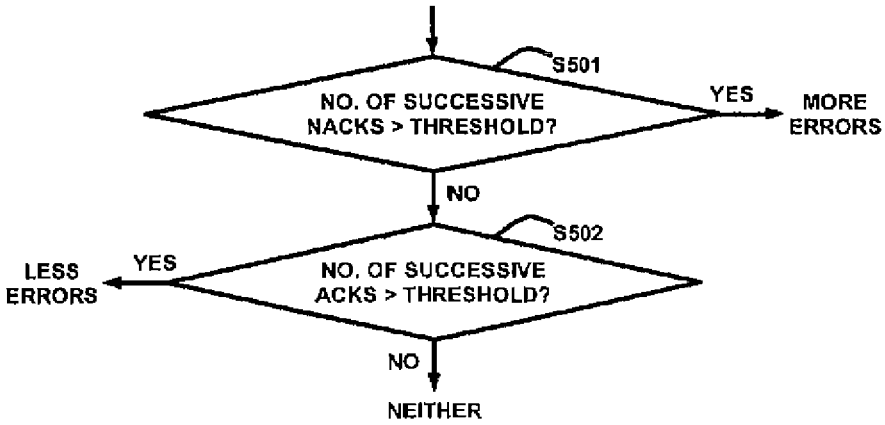
FIG. 5 is a flowchart illustrating determination of a measure of errors occurring in communication over a wireless link according to a preferred embodiment of the invention.

FIG. 5 is a flowchart illustrating determination of a measure of errors occurring in communication over a wireless link according to a preferred embodiment of the invention. This operation corresponds to a preferred embodiment of steps S401 and S402 in FIG. 4 above.

Briefly, the measure of errors used according to FIG. 5 is determined by monitoring a number of no-acknowledgment (NACK) messages and a number of acknowledgment (ACK) messages that occur for a wireless communication link. NACK and ACK messages are well-known in the art of communications. It is determined that the measure of errors corresponds to more errors than a first predetermined threshold when more than a predetermined number of NACK messages occur in succession. Likewise, it is determined that the measure of errors corresponds to fewer errors than a second predetermined threshold when more than a predetermined number of ACK messages occur in succession.

Thus, in step S501, a number of successively received and/or generated NACK messages is compared to a threshold. If this number of NACK messages exceeds the threshold (or alternatively equals or exceeds the threshold), then it is determined that more errors than the first predetermined threshold have occurred.

In step S502, a number of successively received and/or generated ACK messages is compared to a threshold. If this number of ACK messages exceeds the threshold (or alternatively equals or exceeds the threshold), then it is determined that less errors than the second predetermined threshold have occurred.

The thresholds used in steps S501 and S502 are preferably dependent upon the current set of wireless link parameters that are being used for a communication, as discussed below with reference to FIG. 6.

Figure 6:
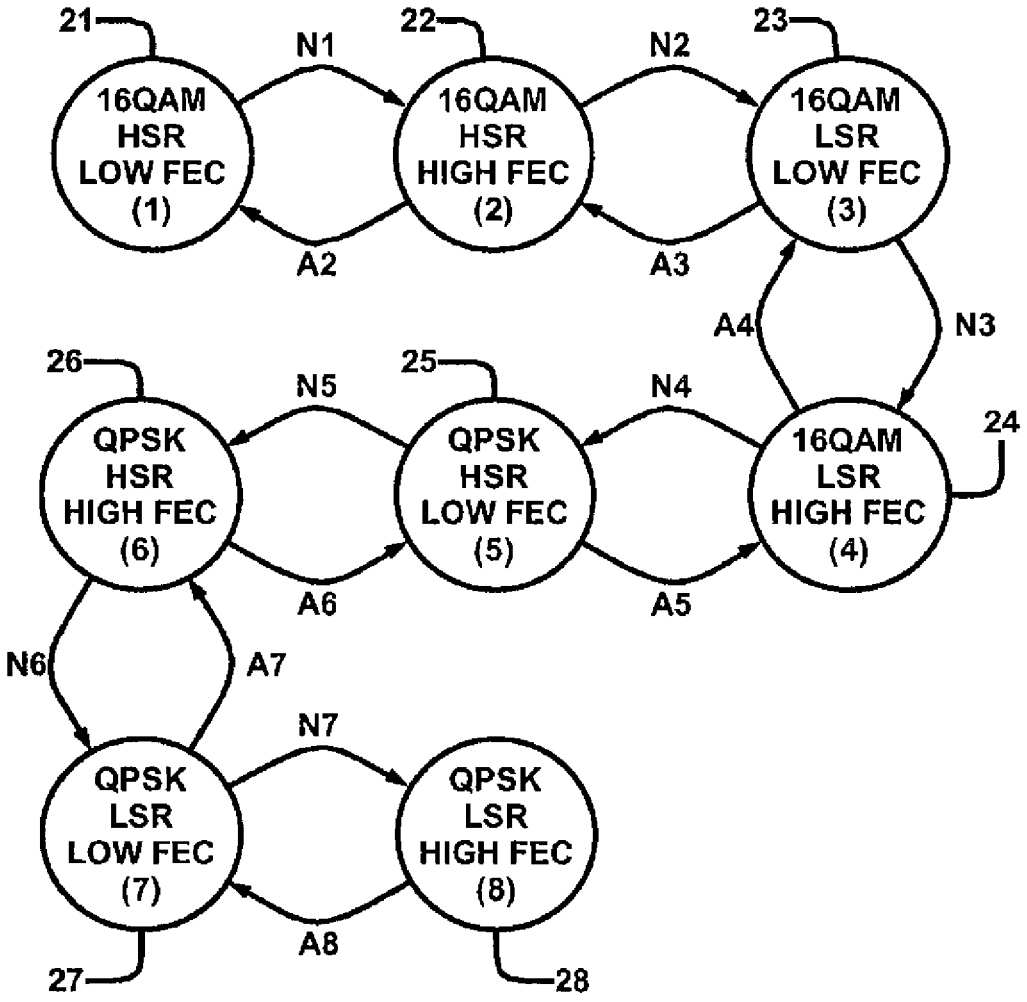
FIG. 6 is a state diagram illustrating dynamic adaptation of wireless link parameters according to a preferred embodiment of the invention.

FIG. 6 is a state diagram illustrating dynamic adaptation of wireless link parameters according to a preferred embodiment of the invention. The state diagram in FIG. 6 corresponds to the methods of FIGS. 4 and 5 performed using the relationships between wireless link parameters and error rates discussed above with respect to FIG. 3.

In FIG. 6, states 21 to 28 correspond to sets of wireless link parameters, which in turn correspond to lines 11 to 18 in FIG. 3, respectively. States 21 to 28 are assigned indexes i=1 to 8, respectively. These indexes are shown in parenthesis in each state in FIG. 6. Each state, and therefore each index, corresponds to a particular set of wireless link parameters, also as shown.

Thresholds N1 to N7 indicate thresholds for NACK messages. Each of these NACK thresholds corresponds to the threshold used in step S501 of FIG. 5. If the current state of communication is state i, then threshold Ni is used.

Thresholds A2 to A8 indicate thresholds for ACK messages. Each of these ACK thresholds corresponds to the threshold used in step S502 of FIG. 5. If the current state of communication is state i, then threshold Ai is used.

If communication is in state i and Ni successive NACK messages are received and/or generated, communication transitions to state i+1. The set of wireless link parameters is changed to that associated with state i+1. This state corresponds to higher error tolerance for the error rate corresponding to Ni successive NACK messages. For even higher error rates, this state corresponds to higher throughput efficiency than state i.

If communication is in state i and Ai successive ACK messages are received and/or generated, communication transitions to state i−1. The set of wireless link parameters is changed to that associated with state i−1. This state corresponds lower error tolerance for the error rate corresponding to Ai successive ACK messages. For even lower error rates, this state corresponds to higher throughput efficiency than state i.

Because the foregoing operations utilize NACK and ACK messages to trigger state changes, wireless link parameters react dynamically. State changes occur without having to wait for an accumulation of errors to affect BER statistics. Furthermore, the foregoing operation can be easily expanded to accommodate virtually any number of different types and sets of wireless link parameters, providing great flexibility in adapting a communication link to changing conditions.

ALTERNATIVE EMBODIMENTS

Although preferred embodiments of the invention are disclosed herein, many variations are possible which remain within the content, scope and spirit of the invention, and these variations would become clear to those skilled in the art after perusal of this application.

What is claimed is:

1. A method of dynamically adapting wireless link parameters *for a wireless link*, comprising:

determining a plurality of states, each state corresponding to a [plurality] *set* of wireless link parameters;

determining a plurality of thresholds for transitioning [from a current state to a next state of] *between* said plurality of states, said thresholds [comprising a number of] *being determined based on a measure of error rate;*

*monitoring the error rate using a count of* NACK messages [or a number of] *and* ACK messages received using said *set of* wireless link parameters for [said] *a* current state; and transitioning [among said plurality of states] *from the current state to a next state* based on said thresholds[, thereby dynamically adapting said wireless link parameters for a wireless link].

2. A method [as in] *according to* claim 1, wherein said *set of* wireless link parameters [comprise] *comprises* a modulation scheme, a symbol rate, and an error correction scheme.

3. A method [as in] *according to* claim 1, wherein each of said plurality of states can only transition to and from one or two adjacent states.

4. A method [as in] *according to* claim 1, wherein *said set of wireless link parameters corresponding to* said plurality of states are stored in a memory.

5. An apparatus that dynamically adapts wireless link parameters *for a wireless link*, comprising:

a wireless link interface to [a] *the* wireless link;

a processor; and a memory storing instructions executable by the processor to control communication over the wireless link interface, the instructions including the steps of:

determining a plurality of states, each state corresponding to a [plurality] *set* of wireless link parameters;

determining a plurality of thresholds for transitioning [from a current state to a next state of] *between* said plurality of states, said thresholds [comprising a number] *being determined based on a measure of error rate;*

*monitoring the error rate using a count* of NACK messages [or a number of] *and* ACK messages received using said *set of* wireless link parameters for [said] *a* current state; and transitioning [among said plurality of states] *from the current state to a next state* based on said thresholds[, thereby dynamically adapting said wireless link parameters for the wireless link].

*6. A method of dynamically adapting wireless link parameters, comprising:*

*determining a plurality of states, each state corresponding to a set of wireless link parameters;*

*determining a plurality of thresholds for transitioning between said plurality of states, said thresholds being determined based on a measure of error rate;*

*monitoring the error rate using a count of NACK messages received using said set of wireless link parameters for a current state; and*

*transitioning from the current state to a next state based on said thresholds.*

*7. A method according to claim 6, wherein a threshold is determined by measuring a throughput efficiency versus signal to interference and noise ratio (SINR) for a set of values for the corresponding wireless link parameters.*

*8. A method according to claim 6, wherein the current state is determined by the highest throughput efficiency for a current measure of error rate.*

*9. A method of dynamically adapting wireless link parameters, comprising:*

*determining a plurality of states, each state corresponding to a set of wireless link parameters;*

*determining a plurality of thresholds for transitioning between said plurality of states, said thresholds being determined based on a measure of error rate;*

*monitoring the error rate using a count of ACK messages received using said set of wireless link parameters for a current state; and*

*transitioning from the current state to a next state based on said thresholds.*

*10. An apparatus that dynamically adapts wireless link parameters for a wireless link, comprising:*

*a wireless link interface to the wireless link;*

*a processor; and*

*a memory storing instructions executable by the processor to control communication over the wireless link interface, the instructions including the steps of:*

*determining a plurality of states, each state corresponding to a set of wireless link parameters,*

*determining a plurality of thresholds for transitioning between said plurality of states, said thresholds being determined based on a measure of error rate;*

*monitoring the error rate using a count of NACK messages received using said set of wireless link parameters for a current state, and*

*transitioning from the current state to a next state based on said thresholds.*

*11. An apparatus that dynamically adapts wireless link parameters for a wireless link, comprising:*

*a wireless link interface to the wireless link;*

*a processor; and*

*a memory storing instructions executable by the processor to control communication over the wireless link interface, the instructions including the steps of:*

*determining a plurality of states, each state corresponding to a set of wireless link parameters,*

*determining a plurality of thresholds for transitioning between said plurality of states, said thresholds being determined bases on a measure of error rate,*

*monitoring the error rate using a count of ACK messages received using said set of wireless link parameters for a current state, and*

*transitioning from the current state to a next state based on said thresholds.*

*12. A method of dynamically adapting wireless link parameters, comprising:*

*obtaining a plurality of states, each state corresponding to one or more wireless link parameters;*

*obtaining one or more thresholds for transitioning between a current state and a next state in the plurality of states, the one or more thresholds comprising a measure of errors occurring over a wireless link using the one or more wireless link parameters for the current state; and*

*transitioning among the plurality of states based, at least in part, on the one or more thresholds.*

* * * * *